July 11, 1967  N. J. HELLICAR  3,330,999
ELECTROLYTIC CAPACITOR WITH DIELECTRIC FILM FORMED
ON CERAMIC MATERIAL
Filed Nov. 16, 1964

Inventor
NORMAN J. HELLICAR
By
Attorney

United States Patent Office 3,330,999
Patented July 11, 1967

3,330,999
ELECTROLYTIC CAPACITOR WITH DIELECTRIC FILM FORMED ON CERAMIC MATERIAL
Norman Joseph Hellicar, London, England, assignor to International Standard Electric Corporation, New York, N.Y., a corporation of Delaware
Filed Nov. 16, 1964, Ser. No. 411,415
Claims priority, application Great Britain, Jan. 31, 1964, 4,200/64
9 Claims. (Cl. 317—230)

ABSTRACT OF THE DISCLOSURE

The invention herein provides a ceramic capacitor having a porous body which has been formed by sintering together substantially spherical grains of ceramic material of uniform size and of composition $Ba_{1-x} La_{2x/3} TiO_3$ where $x$ lies between 0.01 and 0.15 where the porosity of the body lies between 20% and 26%, the core of the body having a resistivity of less than 100 ohm-cm. and the body having a surface layer of resistivity in excess of 10 ohm-cm.

---

Figure 1:
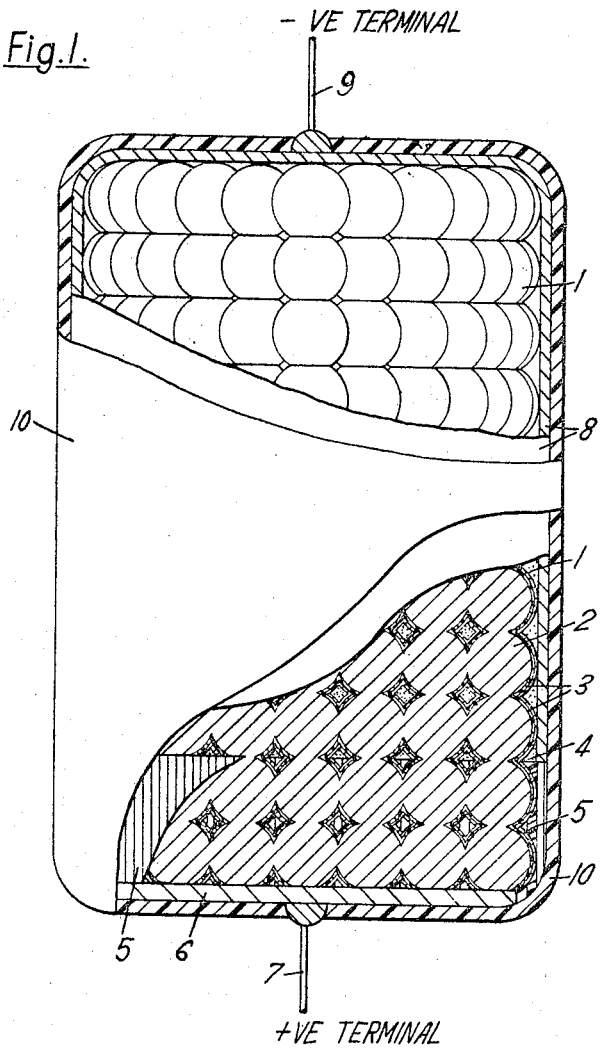

The invention relates to barrier layer ceramic capacitors. A barrier layer ceramic capacitor is one wherein a body of ceramic material of high dielectric constant has a core of relatively low resistivity such as may be obtained by reducing alkaline earth titanate by firing it in a reducing atmosphere, the body having a surface layer of relatively high resistivity which functions as the dielectric of the capacitor. The surface layer may be produced by reoxidising the surface of the reduced alkaline earth titanate core.

In one known form of ceramic capacitor grains of alkaline earth titanate are compacted and sintered together, the sintered body is chemically reduced to render it conductive, and silver electrodes are fired on to different surface portions of the body in an oxidising atmosphere, the surface layers underneath the respective silver electrodes being reoxidised to form dielectric layers.

Solid electrolytic capacitors are also known in which an electrode surface is covered by a thin dielectric film and a solid semiconductor oxide separates the dielectric film from another electrode of the capacitor. The semiconductor oxide is one which, when the capacitor is subject to D.C. polarisation, provides oxygen to heal any breakdown or void which may occur in the very thin dielectric film.

According to the present invention there is provided a ceramic capacitor including a porous body which has been formed by sintering together substantially spherical grains of ceramic material of uniform size and of composition $Ba_{1-x} La_{2x/3} TiO_3$, where $x$ lies between 0.01 and 0.15, the porosity of the body lying between 20% and 26%, the core of the body having a resistivity of less than 100 ohm-cm. and the body having a surface layer of resistivity in excess of $10^{11}$ ohm-cm., a coating of a semiconductor oxide which is solid electrolytic material intimately contacting the said surface layer throughout the porous body, ohmic contacts to the semiconductor oxide and to the core, and an opaque and moisture-impervious encapsulation for the capacitor.

Pure barium titanate is a substance which has a perovskite structure. In the temperature range from about 20° C. to 120° C. it has a tetragonal symmetry and exhibits marked polarisation effects. It also has a dielectric constant in excess of 2,000. Above 120° C. the crystal symmetry is cubic and there is no polar axis; the dielectric constant falls from a maximum of about 20,000 at 120° C. to a steady value of about 1000. By analogy with magnetic materials, the very sharp peak on the dielectric constant—temperature curve which occurs at 120° C.—is referred to as the Curie point and below the Curie point the material is said to be ferroelectric, the high dielectric constant being associated with spontaneous polarisation. Above the Curie temperature the material is said to be paraelectric. In the ferro-electric range the effective dielectric constant is dependent not only upon temperature but upon voltage stress applied to the material, while in the flat portion of the paraelectric region remote from the Curie point, the dielectric constant is relatively insensitive to both temperature and voltage stress. Lanthanum titanate, represented by the molecular formula $La_{2/3} TiO_3$ can be admixed in amounts up to 15 mol. percent with barium titanate, $BaTiO_3$, without alteration of the lattice structure appropriate to barium titanate. Its presence not only assists in the processes involved in the production of a barrier layer ceramic capacitor, but has a marked effect upon the temperature of the Curie point. With varying amounts of lanthanum titanate added to the barium titanate, the Curie temperature may be depressed from the figure of about 120° C. for the pure barium titanate to as low as −150° C. Thus it is possible by choice of the proportion of lanthanum titanate, to obtain material having a given Curie temperature and hence to produce a capacitor in which, at normal operating temperatures, the ceramic material is either ferroelectric or paraelectric, depending upon the choice of Curie temperature. For some applications where the D.C. voltage stress may be kept low, advantage may be taken of the extremely high dielectric constant in the ferroelectric region; in other applications where the capacitor is subject to appreciable D.C. stress, it is preferable to use material which is paraelectric.

The capacitance per unit area of the surface layer which provides the effective dielectric of the capacitor depends upon the depth to which reoxidisation has been carried out. It is important that contact be made to the low resistivity core of each grain of the sintered material; if, however, the grains are of non-uniform size or shape it is found that narrow necks of ceramic material may be formed which become completely reoxidized, and therefore of high resistivity, thus isolating some of the grain cores with consequent reduction of capacitance and impairment of power factor. It is for this reason that the ceramic grains should be of as uniform size as possible and of spherical shape.

With the very large surface area which is available in the porous body, it is essential to use some self-healing mechanism to repair breakdown or voids in the surface layer. Recourse is made, as in the solid electrolytic capacitor, to the use of a solid semiconductor oxide exhibiting ionic conduction.

For the ohmic contacts to the semiconductor oxide and to the core it is preferred to use metallic layers deposited by evaporaion or sputtering techniques rather than fired on silver. The metallising process can then be carried out independently of the reoxidising process.

We have found that both light and moisture lower the resistivity of the reoxidised layer and, therefore, it is necessary to thoroughly dry the capacitor and then to encapsulate it in opaque material that is impervious to moisture.

Figure 2:
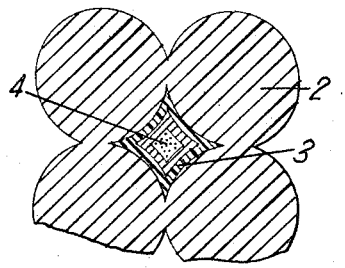

An embodiment of the invention and details of the manufacturing processes involved will now be described with reference to the accompanying drawings in which:

FIG. 1 is a view, in partial section, of a porous ceramic capacitor according to the invention; and FIG. 2 is a scrap view enlarged to show detail in the pores.

Referring to the drawings, it must first be emphasised that these are purely diagrammatic and that the dimensions of grains and of the various layers has been exaggerated in order that they may be seen. The main body of the capacitor is formed of a sintered mass of spherical grains 1 of barium lanthanum titanate whose composition is governed by the desired properties of the body. The grains are each approximately 150 microns in diameter. Each grain has a core 2 having a resistivity of less than $10^2$ ohm-cm. and preferably less than 1 ohm-cm. The grains are sintered together so that a continuous core is provided throughout the body. The spherical surfaces of the body are provided with a continuous surface layer 3 of resistivity in excess of $10^{11}$ ohm-cm. This surface layer, throughout the interior of the body, and also over the exterior surface portions, is coated with an intimately contacting layer of maganese dioxide or other semiconductor oxide which is a solid electrolytic material such as thalium oxide. At one end of the body, which in the embodiment shown is of overall cylindrical shape, the cores are blocked by and the outer surface portion of the body is coated with, silicone rubber impregnating material indicated at 5. The end face of the body at the blocked-off end has been ground away so as to expose the core beneath the surface layer of the end grains and ohmic contact is made to the core by a layer 6 of evaporated chrome-silver. A terminal lead 7 is soldered to the layer 6. This terminal will be polarised positively during operation of the capacitor.

The remainder of the exterior of the body which has not been blanked-off by the silicone rubber 5 is provided with an evaporated layer 8 of chrome-silver which makes ohmic contact with the manganese dioxide electrolyte. The coating 8 provides the negative electrode of the capacitor and a terminal lead 9 is soldered to it. The capacitor is encapsulated in moisture-proof opaque epoxy resin material 10 or may be housed in a hermetically sealed metal case. Typically the overall size of a 5 microfarad capacitor for operation at 5 volts is that of a cylinder 7 mm. diameter and 7 mm. long.

The manufacturing processes involved in the production of a capacitor as described above will now be described.

*Preparation of spherical grain material*

A mixture of powdered barium titanate together with the desired proportion of lanthanum titanate, the particle size being between 1 and 5 microns, is coated with camphor and is then sieved in a machine imparting rotary action with occasional vertical vibration. This sieving action produces in the receiving pan of the machine spherical aggregates which can be graded as requred by mechanical separation. A diameter of aggregate from $10\mu$ to $200\mu$ may be used. Aggregates of as near as possible the same sizes are then transferred to alumina trays, care being taken not to crush the spherical aggregates. The trays are placed in a drying oven and the aggregates subjected to a temperature of between 150 to 200° C. to sublime off the camphor. When the camphor has been removed—normally after about one hour—the material is transferred to a high temperature furnace having a hot zone held at a temperature of between 1200° C. to 1260° C. according to ceramic composition which is being used. Each tray is slowly pushed into the hot zone in the furnace and the temperature is then maintained constant for one hour after equilibrium has been established, after which the trays of material are slowly withdrawn from the furnace and allowed to cool.

The firing or pre-sintering operation, as it may be termed, which has been described above, is very critical. It is desired to prdouce pre-sintered spherical grains which: (1) will not crush during compaction to form porous bodies; (2) will have sufficient surface activity to enable sintering to take place in order to form a sintered body within the desired density range. Each ceramic composition has its own peculiar pre-sintering temperature. The pre-sintering temperatures lie between 1260° C. for the composition containing 3 mol. percent $La_{2/3}TiO_3$ to 1200° C. for the 15% composition. The critical nature of the presintering step can be seen from the following examples. For the composition $Ba_{0.84}La_{0.1}TiO_3$ a pre-sintering temperature of 1215° C. results in grains which are easily crushed during the subsequent compaction stage. These crushed grains adversely affect reduction and reoxidisoation. When the grains are presintered at 1225° C. they can be compacted without crushing and will sinter well, each grain penetrating partly into its neighbor. On reoxidisation of the reduced grains the continuity of the conducting grain centres is maintained. If the pre-sintering temperature is raised to 1235° C. grains can be compacted without crushing but sintering is impaired. The grains do not grow into each other but maintain only surface contact. The porosity of the body is high and on reoxidisation of the reduced grains the continuity of the central conducting cores is broken.

*Formation of body*

After the pre-sintering operation the spherical aggregates are sieved to ensure separation between them and then thoroughly washed to remove any sub-micron sized particles of material which may be held to the surface of the spheres by electrostatic forces. After thorough washing the material is dried in an oven.

Before pressing the spherical aggregates together to form a body of the desired shape, they are cooled with a lubricant and bricks, 4% by weight of camphor is dissolved in ether and the ethereal solution is poured over the spherical grains. The quantity of ether used should be sufficient to wet all the material without swamping it. The material is agitated in a rotary motion until the ether has evaporated off. The spherical grains are then separate and each is coated with camphor. The camphorated grains may be stored in a cool place until required for compacting into capacitor bodies but, if stored, it is desirable that they should be protected from light and moisture.

The camphorated spherical grain material is introduced into a tungsten carbide die for pressing into the required shape of capacitor body. It should be compressed at a pressure sufficiently high to enable compaction to take place, but not so high as to crush the grains. For a body containing 1.4 to 1.5 grams of spherical grain material in a die 0.3″ diameter a pressure of between 2 and 2.5 tons per square inch is suitable.

After compacting, the spherical grains are sintered together. The correct sintering temperature will lie between 1350° C. and 1500° C. according to the ceramic composition and should produce a body having a porosity between 20% and 26%, and preferably between 22% and 24%. Porosity is defined as the ratio $(\rho_0-\rho)\rho_0$ where $\rho_0$ is the ideal density of the barium lanthanum titanate crystalline material, approximately equal to 5.95 grams/cm.². To achieve a porosity of between 22% and 24% the density should lie between 4.52 and 4.62 grams/cm.³. The sintering operation is preferably performed by introducing the compacted body on a stabilised zirconium setter plate into a sintering furnace. The furnace is held at a temperature of between 150° C. and 200° C., until the camphor has sublimed off. When the camphor has sublimed off, the temperature is raised to between 1350° C. and 1500° C. and held at the desired sintering temperature for two hours, the body being subject to an oxdising atmosphere. By way of example, bodies of composition 86 mol. percent barium titanate and 14 mol. percent lanthanum titanate will have a porosity within the range 22% to 24% if they are sintered at a temperature between 1460° C. and 1480° C.

*Reduction and reoxidation*

The resistivity of the sintered body produced as described above is very high (greater than $10^{12}$ ohm-cm.).

It is necessary to reduce the resistivity to as low a value as possible. To this end, after sintering, the furnace is switched off until it acquires a temperature of 1100° C., when forming gas (90% nitrogen and 10% hydrogen) is introduced at a rate of 6 litres per minute for a 1½″ diameter tube furnace. Chemical reduction occurs, without apparent change of the basic crystalline state of the ceramic material. After about 1½ hours reduction a ceramic prepared from 86 mol. percent barium titanate and 14 mol. percent lanthanum titanate will have acquired a resistivity in the region of $10^{-2}$ ohm-cm. The actual reduction temperature and the length of time for which reduction is carried out depends somewhat upon the initial ceramic composition but, in any case, the reduction should be such that, when the body is measured in its cold state the resistivity is less than $10^2$ ohm-cm. and preferably less than 0.1 ohm-cm.

It is now necessary to produce the reoxidised surface layer on the reduced porous ceramic body. At the present time it is believed that a portion of the barium lanthanum titanate is dissociated into barium oxide lanthanum oxide and titanium dioxide, the dissociation being assisted by the presence of lanthanum titanate, and that the free titanium dioxide is reduced wholly or partially towards the sesquioxide $Ti_2O_3$. The resistivity of titanium dioxide which has been reduced has been found to be of the order of $10^{-2}$ ohm-cm., whilst the material has maintained its rutile structure. In the reoxidisation process, not only should the titanium dioxide be fully reoxidised to its stoichiometric proportions, but it should be reassociated with the barium oxide to reform the high dielectric constant barium titanate. The reoxidised layer will be more or less completely reformed into barium lanthanum titanate of stoichiometric proportions but the resistivity of the ceramic will fall off from a maximum value at the surface towards lower valuues as the fully reduced material in the core of the grains is approached. With prolonged reoxidisation it is possible to reoxidise the ceramic completely, which, of course, is not desired. Rather only a surface layer should be reoxidised and then the resulting capacitance per unit area of the sintered body will depend upon the depth of the surface layer and therefore upon the duration of the reoxidising process. For reoxidising, the supply of forming gas to the furnace is stopped, air or oxygen is admitted, and the furnace temperature maintained at the temperature at which reduction occurred. On the other hand, reoxidisation may be accomplished at any temperature within the range 800° C. to 1200° C. By way of example, a body having a total surface area of 27 cm.$^2$ and of ceramic composition containing 15 mol. percent of lanthanum titanate gave a capacitance of 4.9 microfarads after reoxidisation in air for two hours at 870° C., while a body of surface area 35 cm.$^2$ and having a composition containing 12.5% lanthanum titanate gave a capacitance of 35 microfarads after reoxidisation for two hours at 870° C.

*Electrodes*

As with the solid tantalum capacitor, so with the porous ceramic capacitor of the present invention, the very large surface area of the body may have imperfections which necessitates the use of a solid electrolyte semiconducting oxide to heal voids or any subsequent breakdowns of the reoxidised layer. For this purpose manganese dioxide is applied, as will be described below. Before manganesing, however, the pores of the body are blocked off adjacent a surface area at which ohmic contact is to be made to the reduced core material. This blocking-off operation is preferably performed as follows. Briefly, the pores in the portion of the body which is to be blocked off are impregnated with silicone rubber. After this has been done the body is dipped into a dilute manganese nitrate solution (specific gravity 1.5 at 20° C.) for fifteen minutes. After draining and removal of excess nitrate solution the body is dried and transferred to an oven where the nitrate is decomposed at a temperature of between 200° C. and 220° C. This treatment is repeated several times, using a concentrated solution of molten manganese nitrate for the second and subsequent dippings.

After the manganesing process has been completed, any excess silicone rubber covering the surface at which it is desired to make contact with the core of the body is removed and the surface is ground to remove the reoxidised layer and expose the core material. The body is then masked and chromium and silver are codeposited by evaporation onto the exposed core material and also over a separate portion of the manganese dioxide coating of the body. Alternatively aluminum, nickel, copper or gold may be applied to the desired surfaces by known evaporation or sputtering techniques. In the case of a chrome-silver layer a further layer of pure silver is deposited upon the electrode surfaces after which leads be soldered thereto. Finally the body is encapsulated in a moisture-proof opaque covering or casing.

It is to be understood that the foregoing description of specific examples of this invention is not to be considered as a limitation of its scope.

What we claim is:

1. A ceramic capacitor comprising a mass of substantially spherical and uniform size grains sintered into a porous body, the composition of said grains being of the formula $Ba_{1-x}La_{2x/3}TiO_3$, where x lies between 0.01 and 0.15, the porosity of said body being between 20% and 26% by volume, the core of said body having a resistivity of less than 100 ohm-cm. and the body having a surface layer of resistivity in excess of $10^{11}$ ohm-cm., a coating of a solid electrolytic semi-conductive oxide intimately contacting said surface layer throughout the porous body, and ohmic contacts electrically connected to the semiconductor oxide and to said core, respectively.

2. A ceramic capacitor as claimed in claim 1, wherein the semiconductor oxide is manganese dioxide.

3. A ceramic capacitor according to claim 1 further comprising an opaque and moisture-impervious encapsulation for said capacitor.

4. A ceramic capacitor according to claim 1 wherein said ohmic contacts comprise a chrome-silver layer and terminal leads soldered to said layers.

5. The method of manufacturing a capacitor comprising the steps of: (1) mixing together lanthanum titanate and barium titanate in the particles of the size of 1 to 5 microns, (2) adding a solid binder to the powders, (3) subjecting the powders and binder to rotation and agitation in a sieve to produce spherical agglomerates, (4) selecting spherical agglomerates of substantially uniform size and (5) firing said agglomerates at a temperature below sintering for producing spherical grains composed of said powders adhering together, (6) compacting the spherical grains into a body, (7) sintering the grains into a porous body, (8) firing the resulting porous body in a reducing atmosphere, and (9) subjecting the body to reoxidisation at a temperature and for a time to produce the desired resistivity of the reoxidised layer.

6. The method of manufacturing a capacitor as claimed in claim 5, including the further steps of impregnating the pores of the porous body adjacent an exterior surface thereof with insulating material, coating the remaining surface of the body, including the pores, with the said semiconductor oxide, exposing the core material at the surface portion where the pores have been impregnated with insulating material, and evaporating or sputtering a metallic layer onto the exposed core material and another metallic layer onto a surface portion of the semiconducting oxide.

7. The method of manufacturing a capacitor according to claim 5 wherein said reducing atmosphere is 90% nitrogen and 10% hydrogen and said atmosphere is heated to such a temperature and the reduction time is such that when the porous body is measured in its cold state the resistivity is less than 100 ohms-cm. and preferably less than 0.1 ohm-cm.

8. The method of manufacturing a capacitor according to claim 7 wherein said temperature is 1100° C. and the reduction time is approximately 1½ hours.

9. The method of manufacturing a capacitor according to claim 5 wherein said reoxidation is done at a temperature within the range 800° C. to 1200° C. for approximately two hours.

References Cited

UNITED STATES PATENTS

| | | | |
|---|---|---|---|
| 2,299,667 | 10/1942 | Waterman | 317—230 |
| 2,406,345 | 8/1946 | Brennan | 317—230 |
| 2,936,514 | 5/1960 | Millard | 317—230 |
| 3,166,693 | 1/1965 | Haring et al. | 317—230 |
| 3,241,008 | 3/1966 | Komisarek | 317—230 |

JAMES D. KALLAM, *Primary Examiner.*